United States Patent
Simic et al.

(10) Patent No.: US 11,474,948 B2
(45) Date of Patent: Oct. 18, 2022

(54) ADAPTIVE RETRIEVAL OF OBJECTS FROM REMOTE STORAGE

(71) Applicant: NETFLIX, INC., Los Gatos, CA (US)

(72) Inventors: Zoran Simic, Los Gatos, CA (US); Darrell Denlinger, Milpitas, CA (US); Barak Alon, San Francisco, CA (US); Ameya Ramesh Vasani, Los Gatos, CA (US); Rick Wong, Los Altos, CA (US)

(73) Assignee: NETFLIX, INC., Los Gatos, CA (US)

( * ) Notice: Subject to any disclaimer, the term of this patent is extended or adjusted under 35 U.S.C. 154(b) by 133 days.

(21) Appl. No.: 16/798,103

(22) Filed: Feb. 21, 2020

(65) Prior Publication Data
US 2020/0272568 A1 Aug. 27, 2020

Related U.S. Application Data

(60) Provisional application No. 62/809,454, filed on Feb. 22, 2019.

(51) Int. Cl.
*G06F 12/0868* (2016.01)
*G06F 12/02* (2006.01)
(Continued)

(52) U.S. Cl.
CPC .......... *G06F 12/0868* (2013.01); *G06F 3/067* (2013.01); *G06F 3/0611* (2013.01);
(Continued)

(58) Field of Classification Search
None
See application file for complete search history.

(56) References Cited

U.S. PATENT DOCUMENTS

| | | | |
|---|---|---|---|
| 7,921,179 B1 * | 4/2011 | Zheng | G06F 16/176 |
| | | | 709/213 |
| 10,298,995 B1 * | 5/2019 | Stumbo | H04N 21/44004 |

(Continued)

FOREIGN PATENT DOCUMENTS

WO 2015/100515 A1 7/2015

OTHER PUBLICATIONS

Won, Youjip et al. "Resolving Cycle Extension Overhead Multimedia Data Retrieval", Jun. 2002, iCase: The Institution of Control, Automation, and Systems Engineers, vol. 4, No. 2, pp. 164-168. (Year: 2002).*

(Continued)

*Primary Examiner* — Jane Wei
(74) *Attorney, Agent, or Firm* — Artegis Law Group, LLP

(57) ABSTRACT

Various embodiments of the present application set forth a computer-implemented method for accessing data comprising identifying a first set of read operations occurring during a first time period, where each read operation included in the set of read operations is associated with retrieving a different portion of at least one object from a storage system, determining a byte density associated with the set of read operations, where the byte density indicates a size of contiguous portions of the at least one object that were retrieved during the first time period, and determining, based on the byte density, a pre-buffering block size for a read operation during a second period, where the pre-buffering block size specifies a size of a portion of at least one object that is to be retrieved from the storage system.

17 Claims, 8 Drawing Sheets

(51) Int. Cl.
  *G06F 3/06* (2006.01)
  *G06F 16/182* (2019.01)
  *G06F 16/14* (2019.01)
  *G06F 9/50* (2006.01)
  *G06F 9/54* (2006.01)

(52) U.S. Cl.
  CPC .......... *G06F 3/0656* (2013.01); *G06F 9/5016* (2013.01); *G06F 9/544* (2013.01); *G06F 12/0246* (2013.01); *G06F 16/156* (2019.01); *G06F 16/1824* (2019.01)

(56) References Cited

U.S. PATENT DOCUMENTS

2008/0250030 A1* 10/2008 Itoh ...................... G11B 27/105
2009/0182945 A1* 7/2009 Aviles ................ H04L 67/1097
  711/122
2016/0300186 A1 10/2016 Scharaswak et al.
2018/0307638 A1 10/2018 Jin et al.
2019/0347043 A1* 11/2019 Hasbun ................. G06F 3/0611
2020/0349074 A1* 11/2020 Kucherov ............. G06F 3/0647

OTHER PUBLICATIONS

Partial Search Report for application No. PCT/US2020/019307 dated May 4, 2020.
International Search Report for application No. PCT/US2020/019307 dated Aug. 14, 2020.
Citation Bot: "Cache (computing)", Retrieved from the Internet: URL:https://en.wikipedia.org/w/index.php?title=Cache_computing) &oldid=883663895 on Aug. 4, 2020, XP055720074, Feb. 16, 2019, 9 pages.

* cited by examiner

ADAPTIVE RETRIEVAL OF OBJECTS FROM REMOTE STORAGE

CROSS-REFERENCE TO RELATED APPLICATIONS

This application claims the priority benefit of U.S. Provisional patent application titled: "OBJECT STORAGE IN A MEDIA PROCESSING PLATFORM," and filed on Feb. 22, 2019 having Ser. No. 62/809,454. The subject matter of this related application is hereby incorporated by reference.

BACKGROUND

Field of the Various Embodiments

Embodiments of the present disclosure relate generally to distributed computing systems and, more specifically, to adaptive retrieval of objects from remote storage.

Description of the Related Art

Distributed computing systems include many different hardware and software components that operate to provide a variety of services to clients of the distributed computing systems. For example, one distributed computing system executing video production services could enable various endpoint devices to access videos that are stored as objects stored within one or more object storage services (OSS).

In various instances, an endpoint device may execute an application that requires a video file to be natively accessible on an endpoint device. For example, an encoding application may require a video file to be accessible as a native file within the file system of the endpoint device. Further, the encoding application may only require a small portion of an otherwise large file that is stored in another location.

Various conventional techniques mount an object as a file within the native file system of the endpoint device and access the object by retrieving the object as a series of chunks received by the OSS. However, the OSS stores various large-sized objects. In such instances, conventional techniques are time-consuming and require various processing, memory, and disk resources of the endpoint device. For example, the processing resources of the endpoint device are consumed by the overhead associated with retrieving each chunk from the OSS. Further, memory and disk resources of the endpoint device are consumed by storing the entire object as a file, even when only a portion is needed.

As the foregoing illustrates, what is needed in the art is a more effective technique to mount and access an object from a remote object storage service.

SUMMARY

Various embodiments of the present application set forth a computer-implemented method for accessing data comprising identifying a first set of read operations occurring during a first time period, where each read operation included in the set of read operations is associated with retrieving a different portion of at least one object from a storage system, determining a byte density associated with the set of read operations, where the byte density indicates a size of contiguous portions of the at least one object that were retrieved during the first time period, and determining, based on the byte density, a pre-buffering block size for a read operation during a second period, where the pre-buffering block size specifies a size of a portion of at least one object that is to be retrieved from the storage system.

Other embodiments include, without limitation, a computer networks that performs one or more aspects of the disclosed techniques, as well as one or more non-transitory computer-readable storage media including instructions for performing one or more aspects of the disclosed techniques.

At least one technological advantage of the disclosed techniques relative to the prior art is that the file system management application enables an endpoint device to efficiently mount objects as one or more files native to the file system of an endpoint device and access remotely-stored objects. In particular, by adaptively modifying the block size of chunks that are received during read operations associated with the remotely-stored object, the file system management application enables an endpoint device to retrieve data that is requested from a given object faster.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
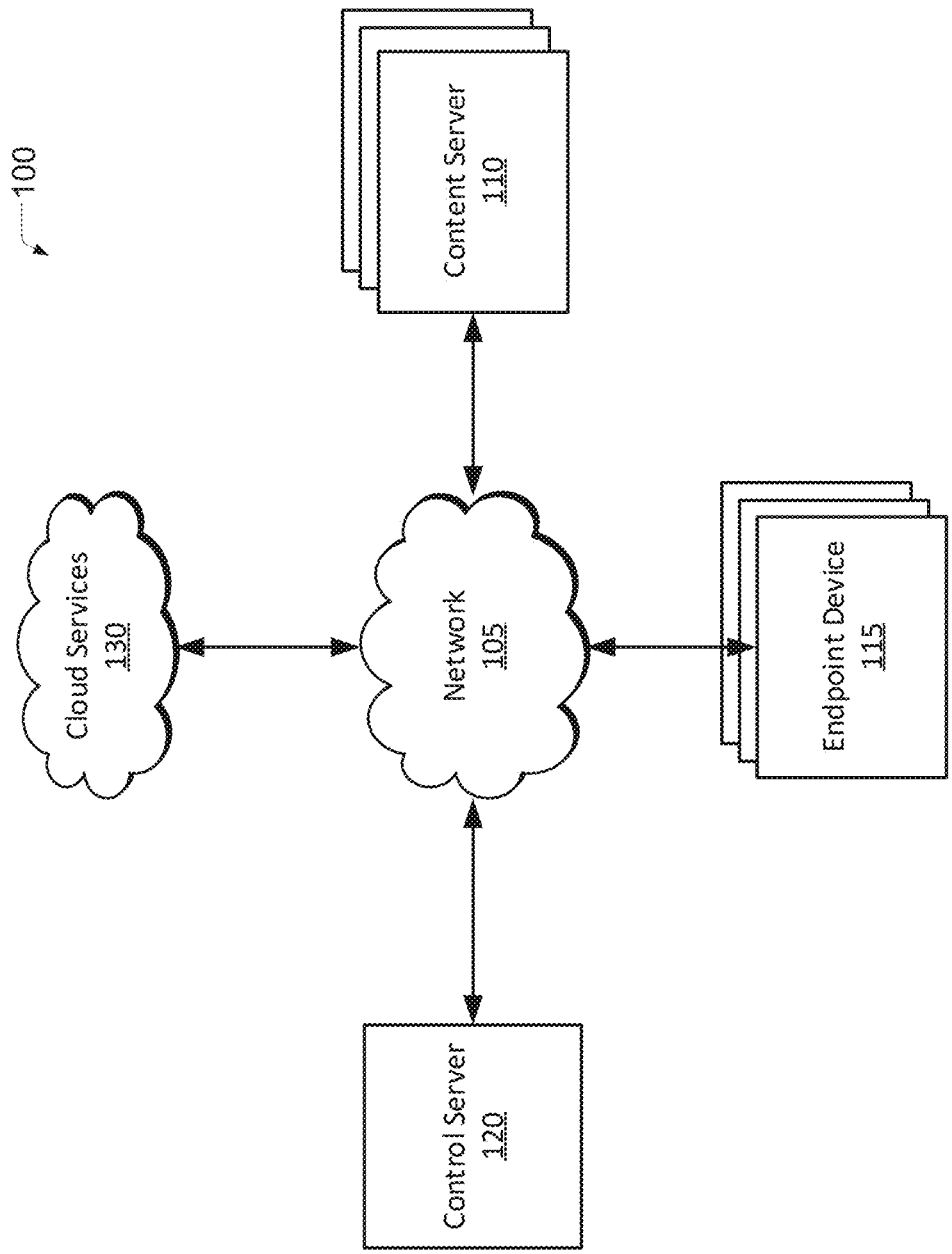
FIG. 1 illustrates a network infrastructure configured to implement one or more aspects of the present disclosure.

In the following description, numerous specific details are set forth to provide a more thorough understanding of the embodiments of the present disclosure. However, it will be apparent to one of skill in the art that the embodiments of the present disclosure may be practiced without one or more of these specific details.

Overview

Distributed computing systems include many different hardware and software components that operate to provide a variety of services to clients of the distributed computer systems. A distributed computing system executing video production services could provide users with the ability to interact with various portions of video files that are stored as objects in remote object storage services. For instance, a user may mount a portion of a video as a file within the file system of an endpoint device in order to edit a video for distribution, such as a trailer. In another instance, one or more users may encode a section of a video in order to prepare the video for subsequent streaming for playback. Therefore, accessing objects that are remotely stored in object storage services is an important component of video production.

Prior art techniques for accessing objects are time-consuming, as such techniques require an endpoint device to send numerous requests to the object storage service when retrieving particular portions of a single object. For example, when an endpoint device attempts to retrieve 1 GB-sized object from the object storage service using prior art techniques, the endpoint device would be required to send 16,384 consecutive reads of 64 kB chunks of the object. Because each call includes a fixed overhead, such prior art techniques are inefficient in retrieving a file corresponding to a mounted file in the file system of the endpoint device. With the disclosed techniques, however, an endpoint device may efficiently access a given portion of a video by dynamically adjusting the size of the chunks that are retrieved by the endpoint device. In particular, by analyzing recent access patterns, the endpoint device may adjust the size of a given chunk that is retrieved from the object storage service, minimizing both the overhead associated with retrieving data and retrieving and storing excess data that is not needed by the endpoint device.

In various embodiments, a file system (FS) management application included in an endpoint device mounts the portions of the object within the endpoint device such that the portions of object are treated as files native to the endpoint device. The FS management application then retrieves various portions of an object as needed. When an object is stored as a set of separate portions, the FS management application accesses a specific portion of the object and stores the portion of the object in the memory of the endpoint device. When accessing an object, the FS management system determines a size for a portion of the object that is to be retrieved during a given read operation by analyzing the access patterns of the endpoint device for a previous window of time. Upon analyzing the access pattern of the endpoint device, the FS management program determines whether the endpoint device is executing a dense access pattern or a sparse access pattern. Depending on the determination, the FS management program then adjusts the size of the portion of the object being read to be larger for dense access patterns and smaller for sparse access patterns.

Advantageously, the FS management application addresses various limitations of conventional object management techniques. More specifically, conventional object management techniques set a static block size for chunks that are retrieved when accessing data. In various embodiments, the single block size inefficiently consumes resources of the computer system, either through use of excessive overhead when the block size is too small, or slowing data access of small chunks of data when the block size is too large. By contrast, the FS management application adaptively adjusts the block size of chunks that are to be retrieved from a remote object storage service such that a given portion of an object is retrieved quickly and efficiently. Further, a distributed computing system that uses the FS management application to access data from remote object storage service enables endpoint devices within the distributed computing system to efficiently access remote objects, such that such objects do not need to be permanently stored at the endpoint device when a user is conducting various production techniques associated with the object.

System Overview

FIG. 1 illustrates a network infrastructure 100, according to various embodiments of the invention. As shown, the network infrastructure 100 includes content servers 110, control server 120, and endpoint devices 115, each of which are connected via communications network 105. Network infrastructure 100 is configured to distribute content to content servers 110, and such content is then distributed on demand to endpoint devices 115.

Each endpoint device 115 communicates with one or more content servers 110 (also referred to as "caches" or "nodes") via network 105 to download content, such as textual data, graphical data, audio data, video data, and other types of data. The downloadable content, also referred to herein as a "file," is then presented to a user of one or more endpoint devices 115. In various embodiments, endpoint devices 115 may include computer systems, set-top boxes (STBs), mobile computers, smartphones, tablets, console and handheld video game systems, digital video recorders (DVRs), DVD players, connected digital TVs, dedicated media streaming devices (e.g., the Roku® set-top box), serverless compute engines, and/or any other technically-feasible computing platform that has network connectivity. In various embodiments, endpoint device 115 is capable of presenting content, such as text, images, audio, and/or video content, to a user. In various embodiments, endpoint device 115 may execute one or more applications to perform various video production techniques on downloaded content.

Each content server 110 could include, for example, a web server, a database (DB), and/or a server application configured to communicate with control server 120 to determine the availability and location of various files that are tracked and managed by control server 120. In various embodiments, each content server 110 may further communicate with cloud services 130 and one or more other content servers 110 in order to "fill" each content server 110 with copies of various files. In addition, content servers 110 may respond to requests for files received from one or more endpoint devices 115. The files may then be distributed from content server 110, or via a broader content distribution network (CDN). In some embodiments, content servers 110 enable a user to authenticate his or her identity (e.g., using a username and password) in order to access files stored on content servers 110. Although only one control server 120 is shown in FIG. 1, in various embodiments, multiple control servers 120 (e.g., control server 120-1, 120-2, etc.) may be implemented to track and manage files.

In various embodiments, cloud services 130 may include an online storage service (e.g., Amazon® Simple Storage Service, Google® Cloud Storage, etc.) in which a catalog of thousands or millions of files is stored and/or accessed in order to fill content servers 110. Cloud services 130 also may provide computing and/or other processing services. Although only one cloud service 130 is shown in FIG. 1, in various embodiments, multiple cloud services 130 (e.g., cloud service 130-1, 130-2, etc.) may be implemented.

Figure 2:
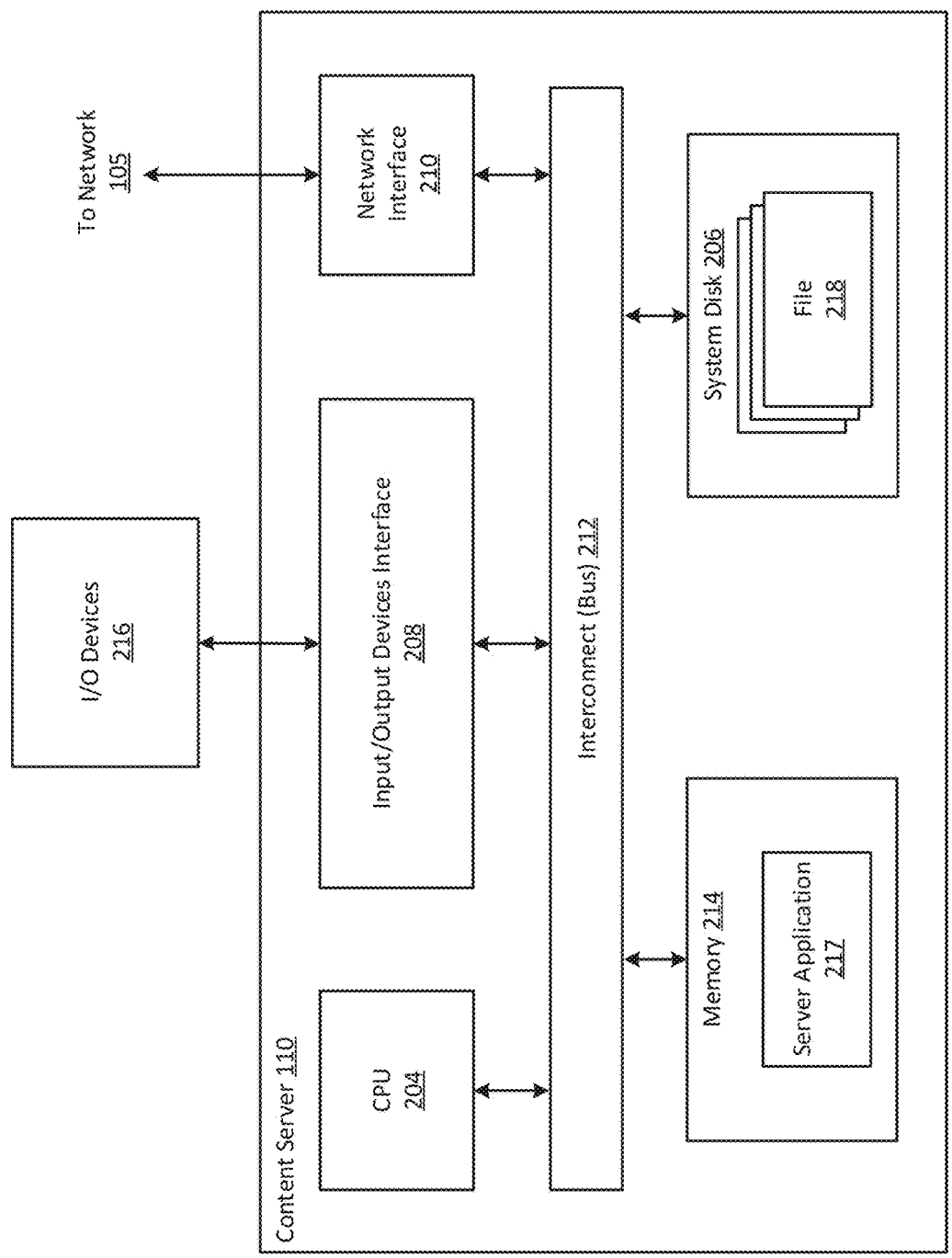
FIG. 2 is a more detailed illustration of the content server of FIG. 1, according to various embodiments of the present disclosure.

FIG. 2 is a more detailed illustration of content server 110 of FIG. 1, according to various embodiments of the present invention. As shown, content server 110 includes, without limitation, central processing unit (CPU) 204, system disk 206, input/output (I/O) device interface 208, network interface 210, interconnect (bus) 212, and system memory 214.

CPU 204 is configured to retrieve and execute programming instructions, such as server application 217, stored in system memory 214. Similarly, CPU 204 is configured to store application data (e.g., software libraries) and retrieve application data from system memory 214. Interconnect 212 is configured to facilitate transmission of data, such as programming instructions and application data, between CPU 204, system disk 206, I/O device interface 208, network interface 210, and system memory 214. I/O device interface 208 is configured to receive input data from one or more I/O devices 216 and transmit the input data to CPU 204 via interconnect 212. For example, the one or more I/O devices 216 may include one or more buttons, a keyboard, a mouse, and/or other input devices. I/O device interface 208 is further configured to receive output data from CPU 204 via interconnect 212 and transmit the output data to the one or more I/O devices 216.

System disk 206 may include one or more hard disk drives (HDDs), solid-state storage devices (SSDs), and/or similar storage devices. System disk 206 is configured to store nonvolatile data, such as one or more files 218 (e.g., audio files, video files, subtitles, application files, software libraries, etc.). Files 218 can then be retrieved by one or more endpoint devices 115 via network 105. In some embodiments, network interface 210 is configured to operate in compliance with one or more communications standards, such as the Ethernet standard, the Bluetooth standard, and/or one or more wireless communication standards.

System memory 214 includes server application 217, which configures content server 110, to service requests received from endpoint device 115 and other content servers 110. For example, the service request could be for one or more files 218. When server application 217 receives a service request for a specific file, server application 217 retrieves the corresponding file 218 from system disk 206 and transmits file 218 to endpoint device 115 and/or content server 110 via network 105.

File 218 could, for example, be one of a plurality of digital items, such visual content items like videos and/or still images. Similarly, file 218 could be one of a plurality of textual content items associated with one or more visual content items, such as movie metadata. In various embodiments, file 218 may be a one of a plurality of secure application data items associated with one or more content items and/or applications being executed by content server 110, control server 120, and/or endpoint device 115.

Figure 3:
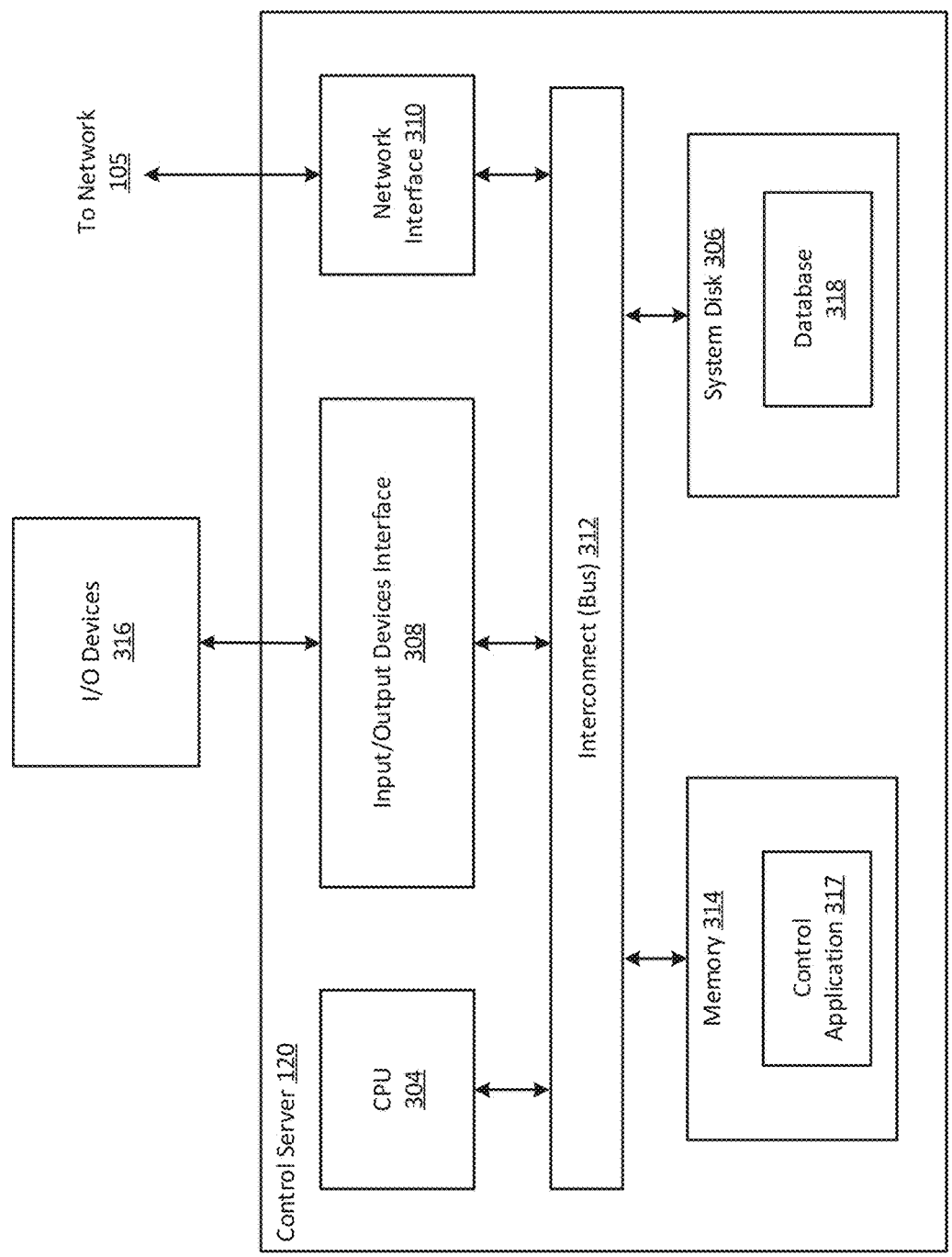
FIG. 3 is a more detailed illustration of the control server of FIG. 1, according to various embodiments of the present disclosure.

FIG. 3 is a more detailed illustration of control server 120 of FIG. 1, according to various embodiments of the present invention. As shown, control server 120 includes, without limitation, CPU 304, system disk 306, I/O device interface 308, network interface 310, interconnect 312, and system memory 314.

CPU 304 is configured to retrieve and execute programming instructions, such as control application 317, stored in system memory 314. Similarly, CPU 304 is configured to store application data (e.g., software libraries) and retrieve application data from system memory 314 and/or database 318 that is stored in system disk 306. Interconnect 312 is configured to facilitate transmission of data between CPU 304, system disk 306, I/O device interface 308, network interface 310, and system memory 314. I/O device interface 308 is configured to transmit input data and output data between the one or more I/O devices 316 and CPU 304 via interconnect 312. In various embodiments, system disk 306 may include one or more hard disk drives, solid state storage devices, etc. In various embodiments, system disk 206 (shown in FIG. 2) is configured to store database 318 that stores information associated with one or more content servers 110, cloud services 130, and/or files 218.

System memory 314 includes control application 317 configured to access information stored in database 318 and process the information to determine the manner in which specific files 218 will be replicated across content servers 110 included in network infrastructure 100. Control application 317 may further be configured to receive and analyze performance characteristics associated with one or more content servers 110 and/or endpoint devices 115.

In various embodiments, control application 317 may further be configured to transmit one or more font patch files stored in database 318 to endpoint devices 115. For example, endpoint device 115 could send one or more update requests to control server 120 for each font patch file stored in database 318. Control application 317 could be configured to respond to the one or more update requests by identifying one or more font patch files stored in database 318 and sending the one or more font patch files to endpoint device 115. Additionally or alternatively, control application 317 may be configured to transmit one or more font patch files without receiving a request from endpoint device 115. For example, control application 317 could be configured to periodically send one or more font patch files to each endpoint device 115 included in network infrastructure 100.

Figure 4:
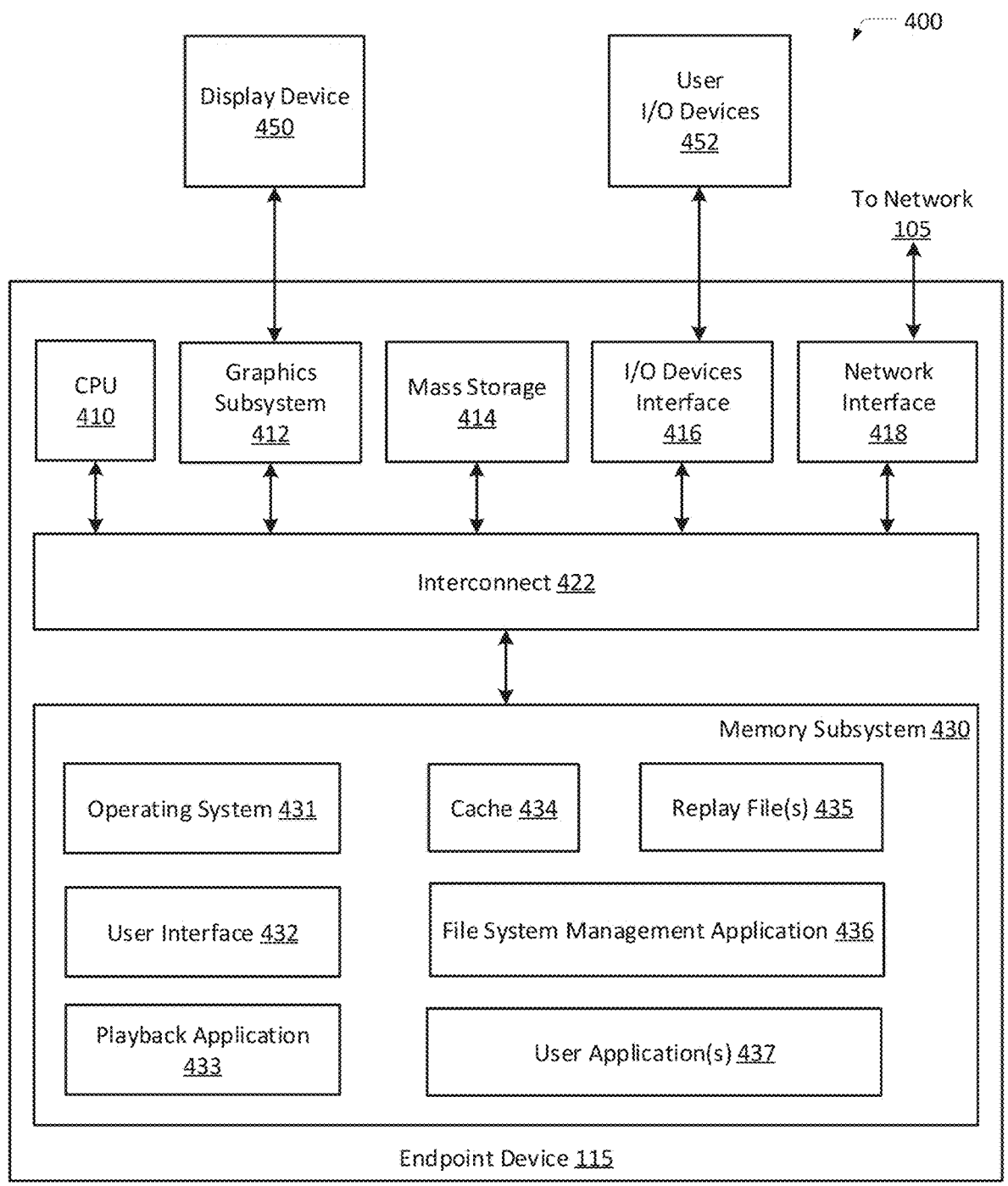
FIG. 4 is a more detailed illustration of the endpoint device of FIG. 1, according to various embodiments of the present disclosure.

FIG. 4 is a more detailed illustration of endpoint device 115 of FIG. 1, according to various embodiments of the present invention. As shown, endpoint device 400 may include, without limitation, CPU 410, graphics subsystem 412, mass storage unit 414, I/O device interface 416, network interface 418, interconnect 422, memory subsystem 430, display device 450, and user I/O devices 452.

In some embodiments, CPU 410 is configured to retrieve and execute programming instructions stored in memory subsystem 430. Similarly, CPU 410 is configured to store and retrieve application data (e.g., software libraries) residing in the memory subsystem 430. Additionally or alternatively, CPU 410 is configured to store and retrieve data, including content items and/or application data, from mass storage unit 414. Interconnect 422 is configured to facilitate transmission of data, such as programming instructions and application data, between the CPU 410, graphics subsystem 412, mass storage unit 414, I/O devices interface 416, network interface 418, and memory subsystem 430.

Graphics subsystem 412 is configured to generate frames of video data and transmit the frames of video data to display device 450. In various embodiments, graphics subsystem 412 may be integrated, along with CPU 410, into an integrated circuit (IC). Display device 450 may comprise any technically-feasible means for generating an image for display. For example, display device 450 could be fabricated using liquid crystal display (LCD) technology, cathode-ray tube technology, and/or light-emitting diode (LED) display technology. In various embodiments, display device 450 may display one or more graphical user interfaces (GUIs).

Mass storage unit 414 can include, for example, a hard disk drive and/or flash-memory storage drive, and is configured to store nonvolatile data. For example, mass storage unit 414 could store one or more files 218, such as content items and/or application data. In various embodiments, endpoint device 115 may copy one or more files 218 stored in memory subsystem 430 (e.g., secure application data) to mass storage unit 414.

Input/output (I/O) device interface 416 is configured to receive input data from user one or more I/O devices 452 and transmit the input data to CPU 410 via interconnect 422. For example, user I/O device 452 may comprise one of more buttons, a keyboard, and a mouse or other pointing device. In various embodiments, I/O device interface 416 also includes an audio output unit configured to generate an electrical audio output signal. In such instances, user I/O device 452 may include an audio output device, such as headphones and/or a loudspeaker, configured to generate an acoustic output in response to the electrical audio input signal. Additionally or alternatively, display device 450 may include the loudspeaker. Examples of suitable devices known in the art that can display video frames and generate an acoustic output include televisions, smartphones, smartwatches, electronic tablets, etc.

Network interface 418 is configured to transmit and receive packets of data via network 105. In some embodiments, network interface 418 is configured to communicate using at least one of the Ethernet standard, the Bluetooth standard, and/or one or more wireless communication standards. Network interface 418 is coupled to CPU 410 via interconnect 422.

Memory subsystem 430 includes various portions of memory, programming instructions, and/or application data. In various embodiments, memory subsystem may include operating system 431, user interface 432, playback application 433, cache 434, replay files 435, FS management application 436, and user applications 437.

Operating system 431 performs system management functions, such as managing hardware devices including graphics subsystem 412, mass storage unit 414, I/O device interface 416, and network interface 418. Operating system 431 also provides process and memory management models for user interface 432, playback application 433, cache 434, FS management application 436, and/or user applications 437. For example, endpoint device 115 may execute operating system 431 to write data to cache 434 and/or sync data included in cache 434 to mass storage unit 414.

User interface (UI) 432 may be, for example, a graphical user interface (GUI) employing a window-and-object metaphor, provides a mechanism for user interaction with endpoint device 115. Persons skilled in the art will recognize the various operating systems 431 and/or user interfaces 432 that are suitable for incorporation into endpoint device 115. In various embodiments, user interface 432 may present various files in a file system, including one or more objects stored in cloud services 130 and mounted as one or more files. In some embodiments, endpoint device 115 may execute a headless configuration that does not include UI 432.

Playback application 433 performs various playback functions associated with content items, such as displaying a GUI for content item selection and video playback of specific multimedia content items. The GUI employs a window-and-object metaphor to provide a mechanism for user interaction with endpoint device 115. Persons skilled in the art will recognize various operating systems and/or user interfaces that are suitable for incorporation into playback application 433. Playback application 433 is configured to request and/or receive content (e.g., one or more files 218) from content server 110 via network interface 418. Further, playback application 433 is configured to interpret the content and present the content via display device 450 and/or user I/O devices 452.

Cache 434 is a portion of volatile memory that stores files 218, such as content items, portions of retrieved objects, and/or application data (e.g., secure application data, metadata, etc.). In various embodiments, cache 434 may correspond to a section of nonvolatile memory. In some embodiments, endpoint device 115 may sync data between page cache 438 and mass storage unit 414 so that copies of data are stored in both cache 434 and mass storage unit 414.

File system (FS) management application 436 is a handler application that manages the access and processing of objects stored in cloud service(s) 130. In various embodiments, FS management application 436 may cause endpoint device 115 to mount the portion(s) of the object as one or more files the in the file system of operating system 431 and may cause endpoint device 115 to retrieve at least a portion of an object when the mounted portion of the object is accessed. In various embodiments, FS management application 436 may cause endpoint device 115 to retrieve one or more portions of the object from cloud service 130 when the portion is not stored in cache 434 and/or mass storage 414. In various embodiments, FS management application 436 may schedule one or more portions of a stored object ("chunks") for retrieving to the memory (e.g., cache 434 and/or mass storage 414) of endpoint device 115.

Replay file(s) 435 are one or more files generated by FS management application 436. In various embodiments, FS management application 436 may record one or more replay files 435 that include data associated with data throughput, download efficiency, resource usage, etc. For example, replay file 435 could include metadata detailing which objects were mounted in the file system, the environment in which FS management application 436 is running, etc. FS management application 436 could also add to replay file 435 metadata that is associated with each file operation (e.g., open operations, read operations, write operations, etc.). Such metadata could include a list of all mounted files that were opened by various applications running on endpoint device 115. Such metadata could also include each byte range read within a specific period, where the byte range read indicates a range of memory addresses of a given object that were retrieved. In some embodiments, replay file 435 may include a list of actions taken by FS management application 436, such as each portion of an object that has been retrieved and/or cached. Additionally or alternatively, replay file 435 may include statistics associated with managing one or more retrieved objects. For example, replay file 435 could include statistics such as total bytes downloaded, total bytes read, total time spent reading, and so forth. In some embodiments, FS management application 436 may cause endpoint device 115 to store multiple replay files 435. In such instances, batches of replay files 435 may be re-run to perform various regression and/or performance tests.

In some embodiments, FS management application 436 may display a visualization replay based on data included in one or more replay files 435. For example, FS management application 436 could display a map of an object that is being downloaded via FS management application 436. In such instances, FS management application 436 may analyze the data associated with various read operations in order to illustrate the access pattern of the portions of the object that have been read and the order in which the portions of the object have been read. As will be discussed in further detail below, FS management application 436 may classify a given access pattern of an object as either dense, indicating largely sequential access of an object, or sparse, indicating a more sporadic access pattern.

User application(s) 437 include one or more applications that process and/or interact with objects stored in cloud service(s) 130. In various embodiments, user application 437 may be and application that processes video, such as a video editing application, an encoding software (e.g., FFmpeg). In some embodiments, user application 437 processes files that are accessible via the local file system. In such instances, FS management application 436 may mount portions of an object such that user application 437 may recognize the object as a file.

Distributed Object Storage System

Figure 5:
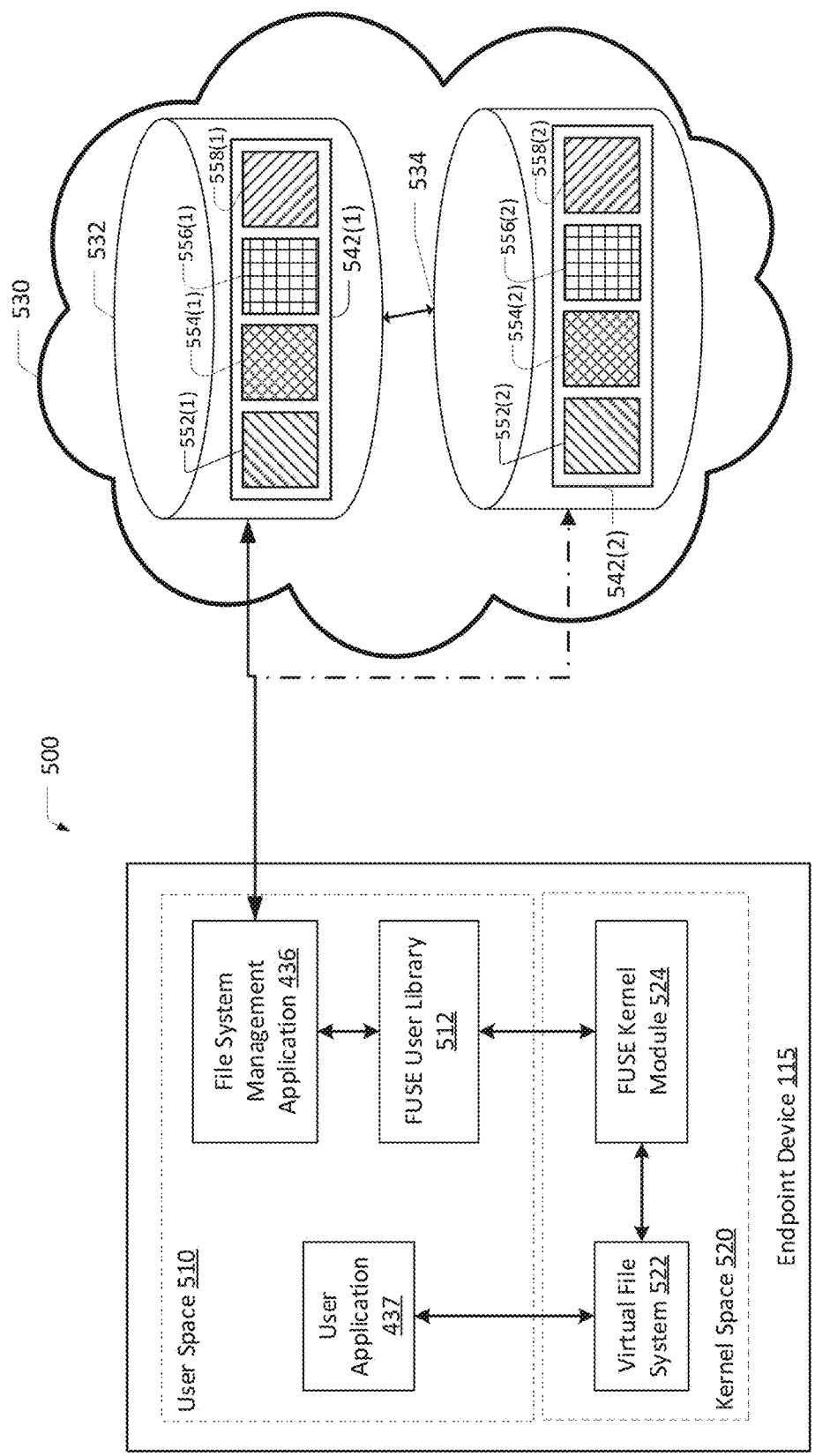
FIG. 5 illustrates a version of the network infrastructure of FIG. 1, according to various embodiments of the present disclosure.

FIG. 5 illustrates a version of the network infrastructure 100 of FIG. 1, according to various embodiments of the present disclosure. As shown, network infrastructure 500 includes, without limitation, network 530 and endpoint device 115. Endpoint device 115 includes user space 510 and kernel space 520. User space 510 includes user application 437, FS management application 436, and file system in userspace (FUSE) user library 512. Kernel space 520 includes VFS 522 and FUSE kernel module 524. Network 530 includes object storage services (OSS) 532, 534. Each OSS includes object 542 (e.g., 542(1), 542(2)). Each object 542 includes a sequence of portions 552-558 (e.g., 552(1), 554(1), 556(1), 558(1), etc.).

Endpoint device 115 includes user space 510 and kernel space 520. For example, memory subsystem 430 could include user space 510 that could run user processes (e.g., operating system 431, user interface 432, playback application, FS management application 436, user application(s) 437, etc.). Memory subsystem 430 could also include kernel space 520 that could manage applications and/or processes running in user space 510. In various embodiments, one or more applications running in kernel space 520 may mount portions 552-558 of object 542 as one or more files in a native file system. In some embodiments, the one or more applications running in kernel space 520 may handle various calls and/or other operations (e.g., read operations, write operations, open operations, etc.) that are performed by applications running in user space 510. For example, when user application 437 within user space 510 makes a call requesting data relating to object 542 (e.g., a read operation to retrieve portion 552), components within kernel space 520 could handle the call. In some embodiments, a component operating within kernel space 520 (e.g., FUSE kernel module) may transmit a separate request to FS management application 436 such that FS management application 436 retrieves portion 552 corresponding to a mounted file in the native file system. Once retrieved, user application 437 may then successfully interact with portion 552.

Endpoint device 115 is connected to network 530 via one or more communications channels that transport large files, objects, and/or other messages between components. For example, FS management application 436 could communicate with one or more OSS 532, 534 in order to access object 542 via streaming and/or download. In various embodiments, FS management application 436 may retrieve one or more portions 552 and mount each portion as a separate file within user space 510.

In various embodiments, object storage services (OSS) 532, 534 may include, for example, one or more devices, such as one or more web servers, that store data from a plurality of sources. In various embodiments, OSS 532, 534 may be an online storage service (e.g., Amazon® Simple Storage Service (S3), Google® Cloud Storage, etc.) in which a catalog of thousands or millions of files and/or objects is stored and/or accessed. In some embodiments, OSS 532, 534 also may provide computing and/or other processing services.

In various embodiments, OSS 532, 534 may permanently store one or more content items associated with an audiovisual program. For example, an audiovisual program may be encoded as different versions, with each version of the audiovisual program being stored as a separate object 542. In some embodiments, object 542 is stored as a segmented object, where a sequence of portions 552-558 combine to form object 542. In such instances, endpoint device 115 may access one or more portions 552-558 instead of accessing the entire object. For example, endpoint device 115 may access portions 554(1) and 554(4) via download and/or streaming from OSS 532. In various embodiments, FS management application 436 may translate the received portions 554(1), 554(4) as separate files that can be processed by user application 437.

In various embodiments, multiple OSS instances 532, 534 may be included in network 530. In such instances, a specific OSS instance 532 be associated with specific region and/or specific endpoint devices 115 that connect to the specific OSS instance 532. For example, OSS instance 532 could be located in the same region as endpoint device 115. In such instances, endpoint device 115 could attempt to access object 542(1) from OSS instance 532 before attempting to access object 542(2) from OSS instance 534.

In some embodiments, the specific OSS instance 532 may include a regional cache (not shown) that stores a set of objects 542 and/or portions 552-558 of object 542 that were originally stored in other OSS instances. In such instances, endpoint device 115 may initially attempt to retrieve portion 556 from the regional cache; retrieving portion 556 from the regional cache improves the download speed and reduces cross-regional transfer costs associated with accessing portion 556 from a OSS instance in a different region (e.g., OSS instance 534). In various embodiments endpoint device 115 may cause portion 556 to be stored in the regional cache. For example, endpoint device 115 could initially retrieve portion 556 from OSS instance 534 and then transmit portion 556 to be stored in the regional cache. In another example, endpoint device 115 requesting object 542 could cause an instance of portion 556 to be transferred and stored in the regional cache. When endpoint device 115 or another endpoint device subsequently accesses object 542, portion 556 may then be retrieved from the regional cache.

In various embodiments, FS management application 436 may provide object 542 by mounting the object as a file in the native file system of endpoint device 115. In some embodiments, user application 437 may run in user space 510 and may send a call that requests data from the mounted object that is stored in the file system. In such instances, the request causes operating system 431 to retrieve the data from the native file system. Additionally or alternatively, user application 437 may request object 542 that is stored in OSS 532, 534. In such instances, when user application 437 sends a call associated with object 542, VFS 522 sends one or more commands associated with the call to FUSE kernel module 524, which may store the request. FUSE kernel module 524 may then route the request via FUSE user library 512 to FS management application 436. FS management application 436 then communicates with one or more of OSS 532, 534 in order to perform the operation with the OSS 532, 534. For example, FS management application 436 could respond to a call for a read operation originally sent by user application 437 by retrieving object 542 internally (e.g., when object 542 is stored in cache 434) or externally (e.g. when object 542 is not stored internally).

In some embodiments, FS management application 436 may translate stored objects into files such that a media application accessing object 542 from OSS 532, 534 view object 542 as a file within the file system. For example, endpoint device 115 could include a Portable Operating System Interface (POSIX)-compliant file system. In such instances, FS management application 436 may translate objects stored in OSS 532, 534 such that the object may be viewed as files in a file system.

In some embodiments, user application 437 may request a mounted file that corresponds to portion 552, which is stored in OSS 532, 534. For example, FS management application 436 could mount the portion 552 as a file included in the file system of endpoint device 115. In such instances, the request generated by user application 437 may be passed through virtual file system (VFS) 522 that acts as the file system for endpoint device 115. VFS 522 may be a layer over the native file system of endpoint device 115 that allows applications in user space 510 to access other file systems. In such instances, VFS 522 may generate one or more requests related to a particular mounted file and send the requests to FUSE kernel module 524. FUSE kernel module 524 then forwards the requests to an applicable handler of the mounted portion 552 within VFS 522, where the handler (e.g., FS management application 436) retrieves portion 552. In various embodiments, FUSE kernel module 524 may pass the request via FUSE user library 512 to FS management application 436. FS management application 436 may then respond to the received request by retrieving portion 552.

FS management application 436 causes endpoint device 115 to access a given stored object 542 via streaming and/or download. In various embodiments, FS management application 436 may cause endpoint device 115 to simultaneously read and/or write object 542 or portions 552-558. In some embodiments, FS management application 436 may record and analyze a set of historical read operations and/or write operations in order to determine specific portions to store in cache 434. In such instances, caching recently-used portions may reduce latency of operations associated with the recently-used portions (e.g., user application 437 encoding portion 556).

In various embodiments, FS management application 436 may mount object 542 and/or portions 552-558 as one or more files that can be accessed and processed by user application 437. In some embodiments, FS management application 436 may mount multiple portions 552-558 as separate files. For example, FS management application could separate object 542 into separate portions and mount each of the portions as separate files. For instance, FS management application 436 could mount multiple portions 554-556 of object 542, where each portion 554, 556 corresponds to a single video frame.

In some embodiments, FS management application 436 may mount a single portion 554 as a file that represents the entire object 542. For example, FS management application 436 could mount portion 552 as a single file. In another example, user application 437 could require access to an entire video asset (e.g., object 542) to successfully complete a process, even when the process only operates with portion 554. FS management application 436 could respond by mounting portion 554 such that user application 437 perceives portion 554 as a complete video asset (e.g., FS management application 436 could fill portions 552, 554, 558 with dummy data to represent object 542).

In some embodiments, two or more portions may be mounted and combined as a single file. In various embodiments, FS management application 436 may concatenate multiple portions 552, 556, 558 of object 542, where the mounted file corresponds to the concatenated data set. For example, FS management application 436 could access three separate portions 552, 556, 558 of object 542 that correspond to three separate video clips. FS management application 436 could then concatenate the separate portions 552, 556, 558 to generate a concatenated portion.

Figure 6:
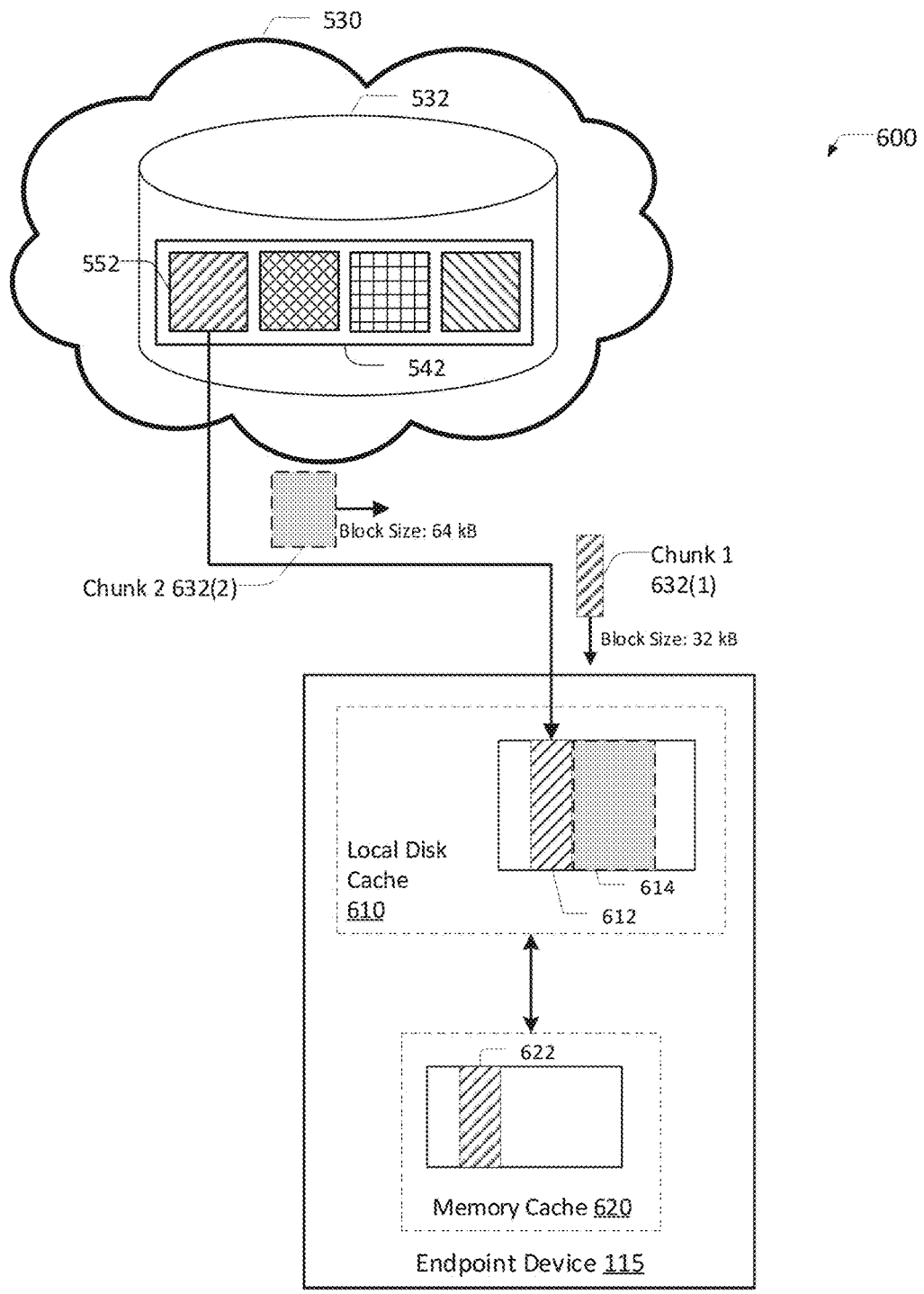
FIG. 6 illustrates a technique of retrieving a portion of an object from remote storage for local caching, according to various embodiments of the present disclosure.

FIG. 6 illustrates a technique of retrieving a portion of an object from remote storage for local caching, according to various embodiments of the present disclosure. As shown, and without limitation, network infrastructure 600 includes network 530 and endpoint device 115. Network 530 includes OSS 532 storing object 542. Endpoint device 115 includes local disk cache 610 and memory cache 620.

Local disk cache 610 is a portion of memory included in either cache 434 or mass storage 414. In various embodiments, multiple processes included in FS management application 436 may access data included in local disk cache 610. In some embodiments, local disk cache 610 may be a segmented cache that caches portions of a uniform size. In such instances, local disk cache may combine chunks to form a specific portion size.

Memory cache 620 is the fastest cache that is included cache 434 of endpoint device 115. In various embodiments, FS management application 436 may access memory cache 620. In some embodiments, one or more applications, such as user application 437, may access memory cache 620 directly. In some embodiments, one or more chunks 622 may be mounted as a file that is retrievable via VFS 522.

In some embodiments, FS management application 436 may respond to a read operation originating at user application 437 by determining whether the applicable portion of object 542 has been retrieved by checking memory cache 620. In such instances, FS management application 436 may determine that the portion is not stored in memory cache 620 ("cache miss"). FS management application 436 by then determine whether local disk cache 610 is storing the particular portion. When local disk cache 610 determines that there is also a cache miss, local disk cache 620 may send a request that causes FS management application 436 to retrieve the portion from OSS 532. In various embodiments, upon local disk cache 610 caching stored chunk 612, local disk cache 610 may cause stored chunk 612 to be transferred to memory cache 620, where the chunk is stored as stored chunk 622. In some embodiments, chunk 622 may correspond to a mounted, complete file. For example, FS management application 436 could mount a portion of object 542 such that user application 237 views the portion as a file representing a complete video asset. In such instances, FS management application 436 may respond to an access request originated by user application 437 by retrieving and storing stored chunk 622.

In some embodiments, local disk cache 610 and/or memory cache 620 may include a segment key in messages relating to object 542 and/or a specific portion 552 of object 542. The segment key may identify a specific portion 552 (e.g., specific range of byte addresses) that FS management application 436 is to retrieve. For example, local disk cache 610 may include a segment key identifying portion 556 in order to cause FS management application 436 to retrieve portion 556. In various examples, the segment key could be constructed from an object key associated with object 542, a pre-buffer block size corresponding to the size of the portion of the object that is to be retrieved, a segment identifier specifying a particular range of byte addresses corresponding to identified portion, and/or a hash of the object key.

Techniques for Managing Distributed Objects

Figure 7:
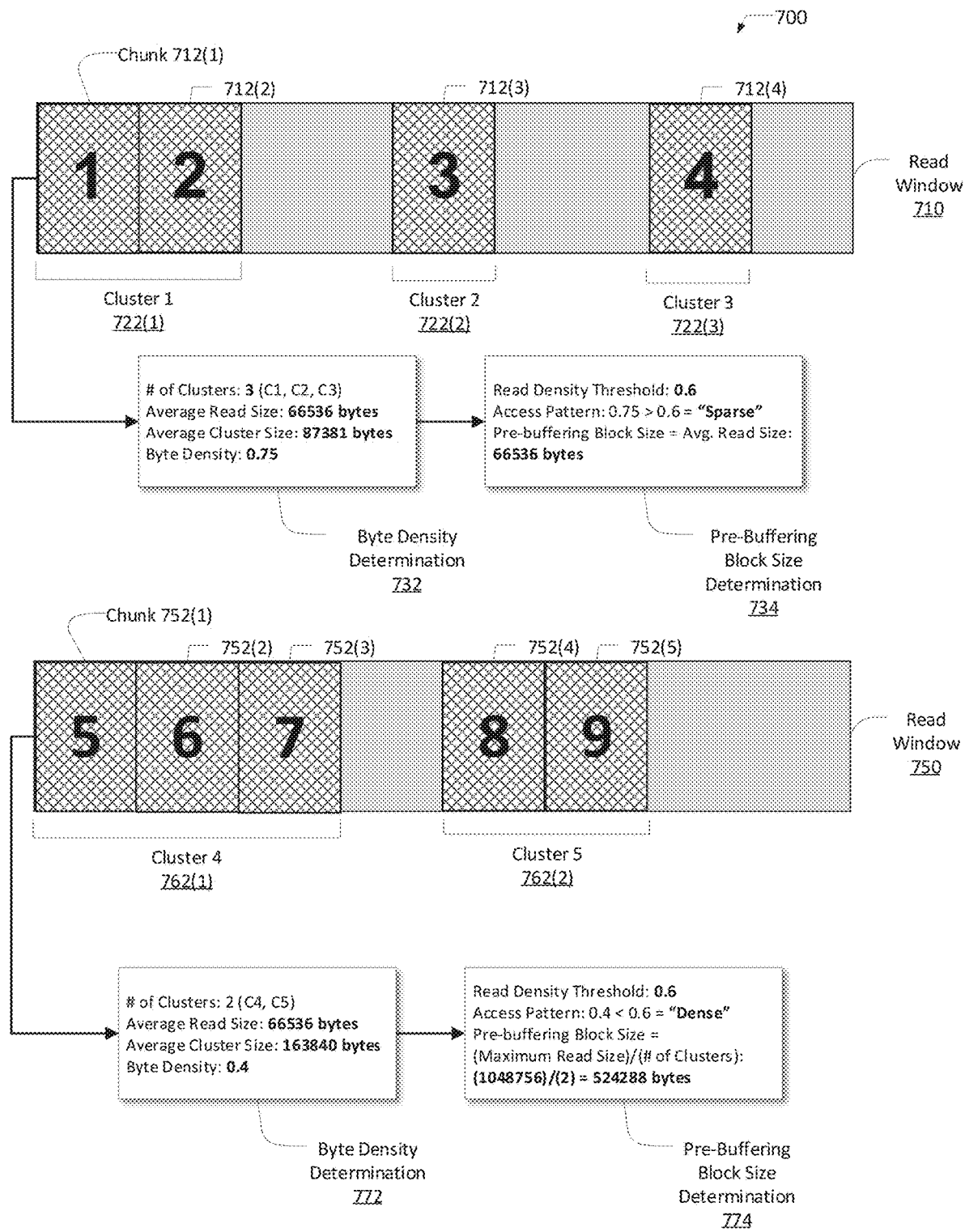
FIG. 7 illustrates a technique of determining a pre-buffering block size for a subsequent read operation of an object stored in remote storage, according to various embodiments of the present disclosure.

FIG. 7 illustrates a technique of determining a pre-buffering block size for a subsequent read operation of an object stored in remote storage, according to various embodiments of the present disclosure. As shown, endpoint device 700 includes, without limitation, read windows 710, 750, chunks 712, 752, clusters 722, 762, byte density determinations 732, 772, and pre-buffering block size determinations 734, 774.

In operation, FS management application 436 analyzes a set of read operations (e.g., read operations corresponding to metadata included one or more replay files 435) to identify read window 710 that corresponds to a specified period of time in which one or more read operations were performed. During read window 710, one or more chunks were retrieved, where each chunk corresponds to a portion of an object that was received by performing a given read operation. FS management application 436 analyzes the attributes of a chunk 712, including the block size (e.g., amount of data retrieved) and the position (e.g., byte addresses of the data retrieved) of chunk 712 within the object.

Based on the attributes of the chunks retrieved during read window 710, FS management application makes a byte density determination 732 that is associated with the access pattern of endpoint device 115 during read window 710. FS management application 436 then uses the computed byte density to perform pre-buffering block size determination 734 in order to set a specific pre-buffering block size for subsequent read operations. The pre-buffering block size is the amount of data that is to be retrieved during a subsequent read operation associated with an object. The pre-buffering block size is then used to specify the block size of chunks that are to be retrieved in subsequent read operations. Details regarding various embodiments of FS management application 436 analyzing read windows 710, 750 to make pre-buffering block size determinations 734, 774 are provided below.

In some example embodiments, when FS management application 436 receives a request for a portion of an object, FS management application 436 may check local disk cache 610 and/or memory cache 620 to first determine whether the portion of data has already been buffered. Upon determining that the portion of data has not yet been buffered, FS management application 436 analyzes metadata associated with one or more previous file operations in order to determine the file operations that were performed within a specific period.

In some embodiments, FS management application 436 may determine read window 710 based on a specific time period. For example, FS management application 436 could set read window 710 as the most-recent five-second period of read operations performed by endpoint device 115. In some embodiments, FS management application 436 may determine read window 710 based on a specific range of read operations. For example, FS management application 436 could set read window 710 as the ten most-recent read operations performed by endpoint device 115.

Read window 710 includes a set of chunks 712 (e.g., chunk 712(1), chunk 712(2), etc.) that correspond to a chunk that was retrieved via a read operation during read window 710. Each chunk has a block size ("read size") that corresponds to an amount of data included in the stored object that was retrieved by endpoint device 115. In various embodiments, each chunk 712 within read window 710 may have the same read size. For example, as shown, each of chunks 712 has a 64 kB read size, where each chunk corresponds to a non-overlapping portion of a stored object.

Read window 710 also includes clusters 722 (e.g., cluster 1 722(1), cluster 2 722(2), etc.) that correspond to groups of contiguous chunks of object 542. For example, cluster 1 722(1) includes two chunks (e.g., 712(1) and 712(2)) corresponding to contiguous chunks that were both retrieved within read window 710, while cluster 3 722(3) includes one chunk (e.g., 712(4)). In some embodiments, contiguous chunks may be retrieved sequentially. For example, FS management application 436 may have retrieved chunk 712(1) and may have subsequently retrieved chunk 712(2). Alternatively, in some embodiments, contiguous chunks may have been retrieved non-sequentially. For example, FS management application 436 may have retrieved chunk 712(2) and may have subsequently retrieved chunk 712(1). In various embodiments, FS management application 436 may analyze clusters 722 within read window 710 in order to determine whether contiguous blocks of data are being accessed by endpoint device 115.

In various embodiments, FS management application 436 may perform a byte density determination 732 by analyzing the clusters 722 and/or individual chunks 712 that were received via read operations within read window 710. For example, FS management application 436 could analyze statistics included in replay file 735 to determine the read size of each chunk 712, the block size of each cluster ("cluster size"), and the number of clusters formed within read window 710. Upon determining such values, FS management application 436 could then compute the average read size and/or the average cluster size for read window 710. In various embodiments, FS management application 436 may compute the byte density based on the read sizes and/or cluster sizes. The byte density corresponds to a size of contiguous portions of an object that was retrieved during the read period. For example, FS management application 436 could compute the byte density for read window 710 as the average read size divided by the average cluster size.

Upon making byte density determination 732, in various embodiments, FS management application 436 may perform a pre-buffering block size determination 734 in order to determine a block size for chunks that are to be retrieved in subsequent read operations. In various embodiments, FS management application 436 may compare the computed byte density value to a read density threshold. In some embodiments, the read density threshold may be a predetermined value that is constant during a mounting session. Based on the comparison, FS management application 436 classifies the access pattern of read window as either sparse or dense. A dense access pattern indicates that contiguous portions of the object were regularly accessed, while a sparse access pattern indicates that contiguous portions of the object were not regularly accessed.

FS management application 436 then sets the pre-buffering block size in accordance with the determined access pattern. For example, FS management application 436 could respond to the determination of a sparse access pattern by setting the pre-buffering block size as equal to the average read size, as computed during byte density determination 732. In another example, FS management application 436 could respond to the determination of a dense access pattern by setting the pre-buffering block size as equal to a maximum read size divided by the number of clusters included in read window 710. Upon determining the pre-buffering block size, FS management application 436 may perform subsequent read operations and receive chunks whose size are based on the pre-buffering block size.

In the illustrated example, FS management application 436 could analyze replay file 435 in order to determine that read window 710 includes three clusters 722(1), 722(2), 722(3). FS management application 436 could also determine that each of chunks 712(1)-712(3) share a read size of 64 kB, corresponding to four separate 64 kB-sized chunks received via read operations during read window 710. FS management application 436 could then compute the average read size as 64 kB. FS management application 436 could determine that cluster 1 722(1) includes two chunks, while cluster 2 722(2) and cluster 3 722(3) each include one chunk. FS management application 436 could compute the average cluster size as 87 kB. FS management application 436 could then compute the byte density by dividing the average byte size by the average cluster size, where the byte density has a value between 0 and 1. As shown, FS management application 436 computes the byte density as (66536 bytes/87381 bytes)=0.75.

Upon determining the byte density, FS management application 436 could compare the byte density to a read density threshold (e.g., 0.6). As shown, FS management application 436 determines that the computed byte density value exceeds the read density threshold and therefore classifies the access pattern of the read operations performed within read window 710 as sparse. Based upon this determination, FS management application 436 could then set the pre-buffering block size as equal to the average read size, which was computed as 64 kB. In such instances, FS management application 436 could cause subsequent read operations performed by endpoint device 115 to retrieve 64 kB-sized chunks of the object.

In another illustrated example, FS management application 436 could analyze replay file 435 in order to determine that a different read window (e.g., read window 750) includes two clusters: cluster 4 762(1) and cluster 5 762(2). FS management application 436 could also determine that each of chunks 752(1)-752(5) share a read size of 64 kB, corresponding to five separate 64 kB-sized chunks received via read operations during read window 750. FS management application 436 could also determine that cluster 4 762(1) includes three chunks, while cluster 5 762(2) includes two chunks. FS management application 436 could compute the average cluster size as 160 kB. FS management application 436 could then compute the byte density by dividing the average byte size by the average cluster size, where the byte density has as a value between 0 and 1. As shown, FS management application 436 computes the byte density for read window 750 as (66536 bytes/163840 bytes) =0.4.

Upon determining the byte density, FS management application 436 could compare the byte density to a read density threshold (e.g., 0.6). As shown, FS management application 436 determines that the computed byte density value does not exceed the read density threshold and therefore classifies the access pattern of the read operations performed within read window 750 as dense. Based upon this determination, FS management application 436 could then set the pre-buffering block size based on the maximum read size. For example, FS management application 436 could set the pre-buffering block size as equal to a maximum read size divided by the number of clusters included in read window 750. Alternatively, in another example, FS management application 436 may set the pre-buffering block size that is equal to the maximum block size. In some embodiments, the maximum read size is a constant size for a given mounting session (e.g., 1048756 bytes). In such instances, FS management application 436 could compute the pre-buffering block size as (1048756 bytes/2)=512 kB. In such instances, FS management application 436 could cause subsequent read operations performed by endpoint device 115 to retrieve 512 kB-sized chunks of the object.

In various embodiments, FS management application 436 sets the pre-buffering block size as the maximum read size divided by the number of clusters in order to ensure that a given read operation does not consume excessive memory. For example, a multi-thread group could separately read different parts of an object densely, where a first thread reads chunks 752(1)-752(3) included in cluster 4 762(1), while a second thread reads chunks 752(4)-752(5) in cluster 5 762(2). In such instances, dividing the maximum read size by the cluster size reduces the amount of memory consumed.

Figure 8:
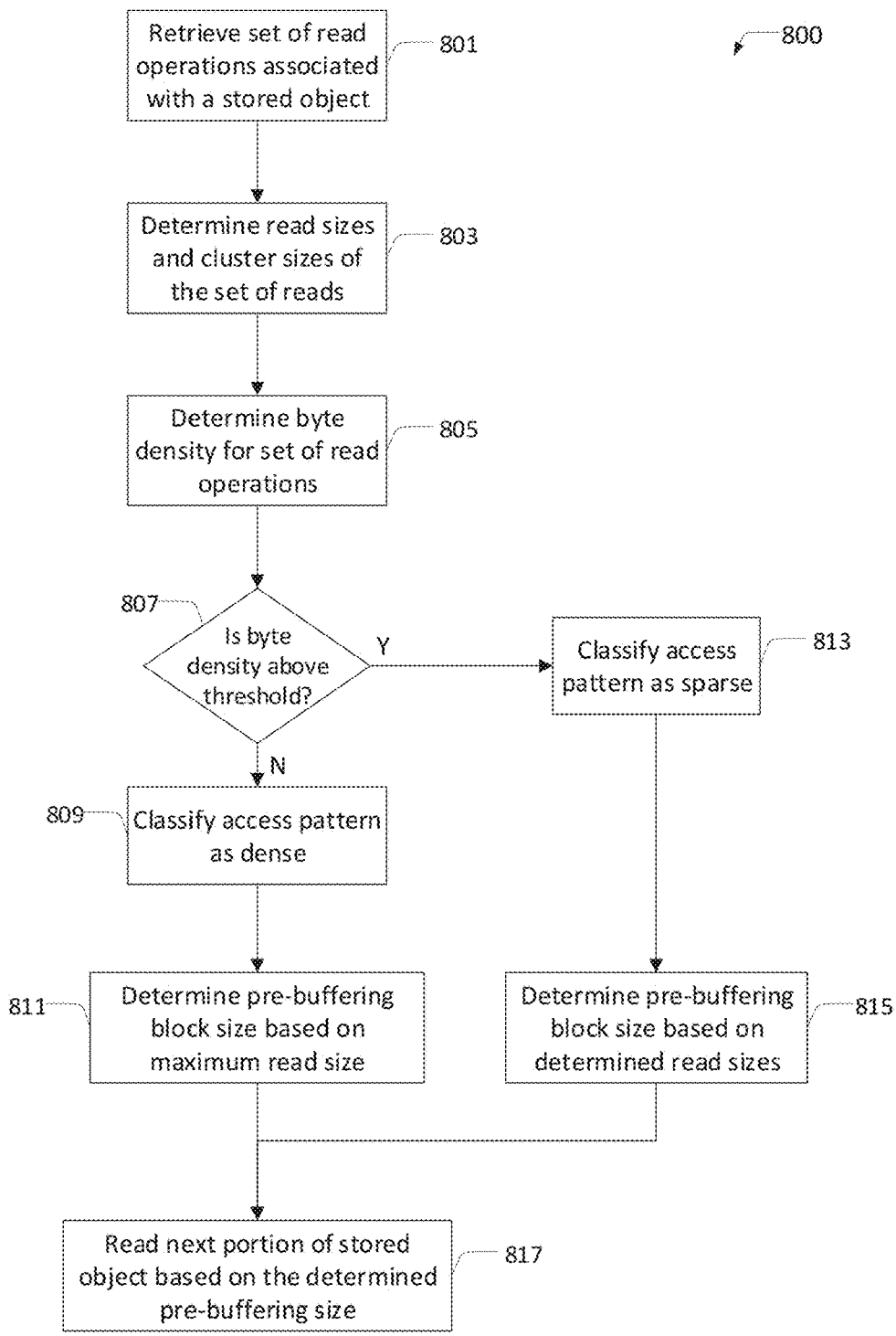
FIG. 8 sets forth a flow diagram of method steps for determining the size of a portion of an object stored in remote storage that is to be retrieved, according to various embodiments of the present disclosure.

FIG. 8 sets forth a flow diagram of method steps for determining the size of a portion of an object stored in remote storage that is to be retrieved, according to various embodiments of the present disclosure. Although the method steps are described with reference to the systems of FIGS. 1-7, persons skilled in the art will understand that any system configured to implement the method steps, in any order, falls within the scope of the present disclosure.

Method 800 begins at step 801, where endpoint device 115 retrieves a set of read operations associated with a stored object. In various embodiments, FS management application 436 retrieves metadata associated with endpoint device 115 accessing one or more objects within a specific period. For example, FS management application 436 could analyze data included in replay file 435 associated with a group of read operations performed within read window that includes the previous ten read operations.

At step 803, endpoint device 115 determines read sizes and cluster sizes of the set of read operations. In various embodiments, FS management application 436 may analyze each read performed within the read window in order to determine the block size of the chunk received during each read operation, as well as the size of one or more clusters formed during the read window. In such instances, each cluster consists of contiguous chunks that were read during the read window. In some embodiments, FS management application 436 may also determine the average read size as the average block size for the chunks received during the read window, and determine the average cluster size as the average block size of contiguous chunks that were accessed during the first period.

At step 805, endpoint device 115 determines the byte density for the set of read operations. In various embodiments, FS management application 436 may determine the byte density based on the determined read sizes and cluster sizes. For example, FS management application 436 could compute the byte density as the average read size divided by the average cluster size, such that the byte density is a value between 0.0 and 1.0.

At step 807, endpoint device 115 compares the byte density with a read density threshold. In various embodiments, FS management application 436 may compare the determined byte density value to a predetermined read density threshold in order to classify the access pattern of the read window as sparse or dense. For example, the read density threshold may be set at 0.6. When FS management application 436 determines that the byte density value is above 0.6, FS management application 436 proceeds to step 813; otherwise, FS management application 436 determines that the byte density values is below the read density threshold and proceeds to step 809.

At step 809, endpoint device 115 classifies the access pattern as dense. In various embodiments, FS management application 436 may determine that the access pattern for the previous read window was dense, indicating that contiguous portions of the object were regularly accessed. In such instances, FS management application 436 may set a high block size for the chunks retrieved during subsequent read operations. At step 811, FS management application 436 determines the pre-buffering block size based on the maximum read size. For example, FS management application 436 could set the pre-buffering block size for a chunk as equal to the maximum read size divided by the number of chunks that were included in the read window.

Returning to step 807, upon determining that the byte density value does exceeds the read density threshold, endpoint device 115 proceeds to step 813, where endpoint device 115 classifies the access pattern as sparse. In various embodiments, FS management application 436 may determine that the access pattern for the previous read window was sparse, indicating that contiguous portions of the object were not regularly accessed. In such instances, FS management application 436 may set a low block size for the chunks retrieved during subsequent read operations. At step 815, FS management application 436 determines the pre-buffering block size based on the determined read sizes. For example, FS management application 436 could set the pre-buffering block size for a chunk as equal to the determined average read size.

As step 817, endpoint device 115 reads the next portion of the stored object based on the pre-buffering block size. In various embodiments, FS management application 436 performs a read operation to receive one or more chunks that have block sizes based on the pre-buffering block size. In some embodiments, the pre-buffering block size may be divided by a number of threads in a multi-thread group. In such instances, each thread included in the multi-thread group uses a block size derived from the determined pre-buffering block size.

In sum, a file system (FS) management application enables an endpoint device to effectively access remotely-stored objects such that portions of the objects are mounted as native files within the file system of an endpoint device. An application, such as an operating system or a user application, may request access to an object that is stored remotely in an object storage service. The FS management application receives a request to access the object and sends requests to retrieve chunks of the object from the object storage service. In some embodiments, the object is stored as a set of multiple portions. In such instances, the FS management application sends requests to retrieve portions of the object in lieu of retrieving the entire object. Once retrieved, the FS management application may present portions of the object as separate files within the file system of the endpoint device.

When accessing a given object, the FS management application adaptively buffers the retrieval of the object by modifying the block size of the chunks that are successively retrieved from the object storage service. In various embodiments, the FS management application analyzes a set of read operations performed during the first period. The FS management application determines the average block size for each chunk that is read ("average read size") and the average block size of contiguous chunks that were accessed during the first period ("average cluster size"). The FS management application determines a byte density based on the average read size and average cluster size, which indicates the density of the access pattern during the first period.

The file system management application compares the byte density to a density threshold to determine whether the access pattern has been dense or sparse. Upon determining that the access pattern has been dense, the FS management application sets a pre-buffering block size of the chunks that are to be used for subsequent read operations. In such instances, the pre-buffering block size is based on the maximum read block size. Otherwise, the FS management application determines that the access pattern has been sparse and sets the pre-buffering block size based on the average read size during the first period. Upon setting the pre-buffering block size, the file management application may then retrieve other portions of the object using one or more chunks with block sizes that are equal to the pre-buffering block size.

At least one technological advantage of the disclosed techniques relative to the prior art is that the file system management application enables an endpoint device to mount remotely-stored objects as one or more files native to the file system of an endpoint device and efficiently access the remotely-stored objects. In particular, by adaptively modifying the block size of chunks that are received during read operations associated with the remotely-stored object, the file system management application enables an endpoint device to retrieve a given object faster. Further, because the pre-buffering block size determined based on the density of the access pattern, the file system management application prevents the block size of chunks from becoming too small (resulting in excess overhead) or too large (resulting in accessing more of an object than required), thus preventing the overconsumption of memory resources.

1. In various embodiments, a computer-implemented method for accessing data comprises identifying a first set of read operations occurring during a first time period, where each read operation included in the set of read operations is associated with retrieving a different portion of at least one object from a storage system, determining a byte density associated with the set of read operations, where the byte density indicates a size of contiguous portions of the at least one object that were retrieved during the first time period, and determining, based on the byte density, a pre-buffering block size for a read operation during a second period, where the pre-buffering block size specifies a size of a portion of at least one object that is to be retrieved from the storage system.

2. The computer-implemented method of clause 1, where determining the byte density comprises computing, based on the first set of read operations, an average read size that indicates an average amount of data retrieved during the first time period, computing, based on the first set of read operations, an average cluster size, that indicates an average amount of contiguous data retrieved during the first time period, and determining the byte density based on both the average read size and the average cluster size.

3. The computer-implemented method of clause 1 or 2, further comprising determining that the byte density exceeds a predetermined density threshold, where selecting the pre-buffering block size comprises setting the pre-buffering block size based on the average read size.

4. The computer-implemented method of any of clauses 1-3, further comprising determining that the byte density is less than or equal to a predetermined density threshold, where selecting the pre-buffering block size comprises setting the pre-buffering block size based on a maximum read size.

5. The computer-implemented method of any of clauses 1-4, further comprising determining that a first portion of the at least one object is not stored in a cache of a first client device, where the read operation is performed to retrieve the first portion from the storage system, and storing the first portion in the cache during the second period.

6. The computer-implemented method of any of clauses 1-5, further comprising performing a second set of read operations during the second period, where each read operation included in the second set of read operations retrieves an amount of data based on the pre-buffering block size.

7. The computer-implemented method of any of clauses 1-6, further comprising retrieving a second set of read operations occurring during a third period that is different from the first time period, where each read operation included in the second set of read operations is associated with retrieving of a portion of the at least one object from storage, determining, based on the second set of read operations, a second byte density associated with the second set of read operations, and determining, based on the second byte density, a second pre-buffering block size for a read operation during a fourth period.

8. The computer-implemented method of any of clauses 1-7, further comprising identifying a set of one or more data clusters, where a data cluster includes a range of contiguous data that was retrieved during the first time period, determining a size of each data cluster included in the set of one or more data clusters, and computing an average cluster size based on the size of each data cluster.

9. The computer-implemented method of any of clauses 1-8, where a first thread performed a first thread read to retrieve a first portion of the at least one object from storage, where the first thread is included in a multi-thread group, and the first thread read is included in the set of read operations, and a second thread performed a second thread read to retrieve a second portion of the at least one object from storage, where the second thread is included in the multi-thread group, and the second thread read is included in the set of read operations.

10. The computer-implemented method of any of clauses 1-9, further comprising determining that the pre-buffering block size exceeds a size threshold, and determining, based on the pre-buffering block size and the size threshold, a set of two or more block sizes for a set of read operations to occur during the second period, where a first thread, based on a first block size included in the set of two or more block sizes, performs a first read operation during the second period to retrieve a first amount of data of the at least one object from storage, and a second thread, based on a second block size included in the set of two or more block sizes, performs a second read operation during the second period to retrieve a second amount of data of the at least one object from storage.

11. In various embodiments, a computing system for accessing data comprises a memory storing a file system management application, and a processor that is coupled to the memory and executes the file system management application to identify a first set of read operations occurring during a first time period, where each read operation included in the set of read operations is associated with retrieving a different portion of at least one object from a storage system, determine a byte density associated with the set of read operations, where the byte density indicates a size of contiguous portions of the at least one object that were retrieved during the first time period, and determine, based on the byte density, a pre-buffering block size for a read operation during a second period, where the pre-buffering block size specifies a size of a portion of at least one object that is to be retrieved from the storage system.

12. The computing system of clause 11, further comprising a first client device that includes the processor, and a regional cache that is remote to the first client device and includes a first object, where the processor performs the read operation during the second period to retrieve at least a portion of the first object.

13. The computing system of clause 11 or 12, further comprising a plurality of object storage systems that includes the storage system, where the storing system includes the regional cache, and where the regional cache is associated with a region in which the first client device is located.

14. The computing system of any of clauses 11-13, where the processor executes the file system management application to further perform a second set of read operations during the second period, where each read operation included in the second set of read operations retrieves an amount of data based on the pre-buffering block size.

15. The computing system of any of clauses 11-14, where the processor determines the byte density by computing, based on the first set of read operations, an average read size that indicates an average amount of data retrieved during the first time period, computing, based on the first set of read operations, an average cluster size, that indicates an average amount of contiguous data retrieved during the first time period, and determining the byte density based on both the average read size and the average cluster size.

16. The computing system of any of clauses 11-15, where the processor executes the file system management application to further determine that a first portion of the at least one object is not stored in a cache of a first client device, where the read operation is performed to retrieve the first portion from the storage system, and store the first portion in the cache during the second period.

17. In various embodiments, one or more non-transitory computer-readable storage media include instructions that, when executed by one or more processors, cause the one or more processors to perform the steps of identifying a first set of read operations occurring during a first time period, where each read operation included in the set of read operations is associated with retrieving a different portion of at least one object from a storage system, determining a byte density associated with the set of read operations, where the byte density indicates a size of contiguous portions of the at least one object that were retrieved during the first time period, and determining, based on the byte density, a pre-buffering block size for a read operation during a second period, where the pre-buffering block size specifies a size of a portion of at least one object that is to be retrieved from the storage system.

18. The one or more non-transitory computer-readable storage media of clause 17, further including instructions that, when executed by one or more processors, cause the one or more processors to perform the step of performing a second set of read operations during the second period, where each read operation included in the second set of read operations retrieves an amount of data based on the pre-buffering block size.

19. The one or more non-transitory computer-readable storage media of clause 17 or 18, where determining the byte density comprises computing, based on the first set of read operations, an average read size that indicates an average amount of data retrieved during the first time period, computing, based on the first set of read operations, an average cluster size, that indicates an average amount of contiguous data retrieved during the first time period, and determining the byte density based on both the average read size and the average cluster size.

20. The one or more non-transitory computer-readable storage media of any of clauses 17-19, further including instructions that, when executed by one or more processors, cause the one or more processors to perform the steps of determining that a first portion of the at least one object is not stored in a cache of a first client device, where the read operation is performed to retrieve the first portion from the storage system, and storing the first portion in the cache during the second period.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for accessing data based on one or more previous access patterns, the method comprising:

classifying, based on a first set of read operations that occurred during a first time period, an access pattern for the first time period, comprising:
identifying the first set of read operations, wherein each read operation included in the first set of read operations is associated with retrieving a different portion of at least one object from a remote storage system,
computing a byte density associated with the first set of read operations, wherein the byte density indicates a size of contiguous portions of the at least one object that were retrieved by the first set of read operations during the first time period, and
generating an access pattern classification based on a comparison of the byte density to a pre-determined threshold;
determining, based on the access pattern classification, a pre-buffering block size that-specifies a size of a portion of the at least one object that is to be retrieved from the remote storage system;
performing, during a second time period subsequent to the first time period, a second set of read operations to retrieve one or more portions of the at least one object, wherein:
each read operation included in the second set of read operations retrieves a specific amount of data of the at least one object, and
the pre-buffering block size specifies the specific amount of data to retrieve for a given read operation; and
storing, in a local storage, the one or more portions of the at least one object.

2. The computer-implemented method of claim 1, wherein determining the byte density comprises:
   computing, based on the first set of read operations, an average read size that indicates an average amount of data retrieved during the first time period;
   computing, based on the first set of read operations, an average cluster size that indicates an average amount of contiguous data retrieved during the first time period; and
   determining the byte density based on both the average read size and the average cluster size.

3. The computer-implemented method of claim 2, wherein:
   generating the access pattern classification comprises determining that the byte density exceeds a predetermined density threshold, and
   determining the pre-buffering block size comprises setting the pre-buffering block size based on the average read size.

4. The computer-implemented method of claim 1, wherein:
   generating the access pattern classification comprises determining that the byte density is less than or equal to a predetermined density threshold, and
   selecting the pre-buffering block size comprises setting the pre-buffering block size based on a maximum read size.

5. The computer-implemented method of claim 1, further comprising:
   determining that a first portion of the at least one object is not stored in a cache of a first client device, wherein at least one read operation of the second set of read operations is performed to retrieve the first portion from the remote storage system; and
   wherein storing the one or more portions of the at least one object comprises storing the first portion in the cache.

6. The computer-implemented method of claim 1, further comprising:
   retrieving a third set of read operations occurring during a third period that is different from the first time period, wherein each read operation included in the third set of read operations is associated with retrieving of a portion of the at least one object from the remote storage system;
   computing, based on the third set of read operations, a second byte density associated with the third set of read operations;
   generating a second access pattern classification based on a second comparison of the second byte density to the pre-determined threshold; and
   determining, based on the second access pattern classification byte density, a second pre-buffering block size for a read operation that is to be performed during a fourth period.

7. The computer-implemented method of claim 1, further comprising:
   identifying a set of one or more data clusters, wherein a data cluster includes a range of contiguous data that was retrieved during the first time period;
   determining a size of each data cluster included in the set of one or more data clusters; and
   computing an average cluster size based on the size of each data cluster.

8. The computer-implemented method of claim 1, wherein:
   a first thread performed a first thread read to retrieve a first portion of the at least one object from the remote storage system, wherein:
      the first thread is included in a multi-thread group, and
      the first thread read is included in the first set of read operations; and
   a second thread performed a second thread read to retrieve a second portion of the at least one object from the remote storage system, wherein:
      the second thread is included in the multi-thread group, and
      the second thread read is included in the first set of read operations.

9. The computer-implemented method of claim 1, further comprising determining that the pre-buffering block size exceeds a size threshold, wherein:
   a set of two or more block sizes for the second set of read operations are determined based on the pre-buffering block size;
   a first thread, based on a first block size included in the set of two or more block sizes, performs a first read operation during the second time period to retrieve a first amount of data of the at least one object from the remote storage system; and
   a second thread, based on a second block size included in the set of two or more block sizes, performs a second read operation during the second time period to retrieve a second amount of data of the at least one object from the remote storage system.

10. A computing system for accessing data based on one or more previous access patterns, the computing system comprising:
   a memory storing a file system management application; and
   a processor that is coupled to the memory and executes the file system management application to:
      classify, based on a first set of read operations that occurred during a first time period, an access pattern for the first time period, comprising:
         identifying the first set of read operations, wherein each read operation included in the first set of read operations is associated with retrieving a different portion of at least one object from a remote storage system,
         compute a byte density associated with the first set of read operations, wherein the byte density indicates a size of contiguous portions of the at least one object that were retrieved by the first set of read operations during the first time period, and
         generate an access pattern classification based on a comparison of the byte density to a pre-determined threshold;
      determining, based on the access pattern classification, a pre-buffering block size that-specifies a size of a portion of the at least one object that is to be retrieved from the remote storage system;
      performing, during a second time period subsequent to the first time period, a second set of read operations to retrieve one or more portions of the at least one object, wherein:
         each read operation included in the second set of read operations retrieves a specific amount of data of the at least one object, and
         the pre-buffering block size specifies the specific amount of data to retrieve for a given read operation; and storing, in a local storage, the one or more portions of the at least one object.

11. The computing system of claim 10, further comprising a first client device that includes the processor and the local storage, wherein:
the remote storage system comprises a regional cache that is remote to the first client device and includes a first object, and
the processor performs the second set of read operations to retrieve at least a portion of the first object from the regional cache.

12. The computing system of claim 11, further comprising a plurality of object storage systems that includes the remote storage system, wherein the regional cache is associated with a region in which the first client device is located.

13. The computing system of claim 10, wherein the processor determines the byte density by:
computing, based on the first set of read operations, an average read size that indicates an average amount of data retrieved during the first time period;
computing, based on the first set of read operations, an average cluster size that indicates an average amount of contiguous data retrieved during the first time period; and
determining the byte density based on both the average read size and the average cluster size.

14. The computing system of claim 10, wherein the processor executes the file system management application to further:
determine that a first portion of the at least one object is not stored in a cache of a first client device, wherein at least one read operation of the second set of read operations is performed to retrieve the first portion from the remote storage system; and
wherein the processor executes the files system management application to store one or more portions of the at least one object by storing the first portion in the cache.

15. One or more non-transitory computer-readable storage media including instructions that, when executed by one or more processors, cause the one or more processors to access data based on one or more previous access patterns by performing the steps of:
classifying, based on a first set of read operations that occurred during a first time period, an access pattern for the first time period, comprising:
identifying the first set of read operations, wherein each read operation included in the first set of read operations is associated with retrieving a different portion of at least one object from a remote storage system,
computing a byte density associated with the first set of read operations, wherein the byte density indicates a size of contiguous portions of the at least one object that were retrieved by the first set of read operations during the first time period, and
generating an access pattern classification based on a comparison of the byte density to a pre-determined threshold;
determining, based on the access pattern classification, a pre-buffering block size that-specifies a size of a portion of the at least one object that is to be retrieved from the remote storage system;
performing, during a second time period subsequent to the first time period, a second set of read operations to retrieve one or more portions of the at least one object, wherein:
each read operation included in the second set of read operations retrieves a specific amount of data of the at least one object, and
the pre-buffering block size specifies the specific amount of data to retrieve for a given read operation; and
storing, in a local storage, the one or more portions of the at least one object.

16. The one or more non-transitory computer-readable storage media of claim 15, wherein determining the byte density comprises:
computing, based on the first set of read operations, an average read size that indicates an average amount of data retrieved during the first time period;
computing, based on the first set of read operations, an average cluster size that indicates an average amount of contiguous data retrieved during the first time period; and
determining the byte density based on both the average read size and the average cluster size.

17. The one or more non-transitory computer-readable storage media of claim 15, further including instructions that, when executed by one or more processors, cause the one or more processors to perform the step of:
determining that a first portion of the at least one object is not stored in a cache of a first client device, wherein at least one read operation of the second set of read operations is performed to retrieve the first portion from the remote storage system; and
wherein storing the one or more portions of the at least one object comprises storing the first portion in the cache.

* * * * *

UNITED STATES PATENT AND TRADEMARK OFFICE
CERTIFICATE OF CORRECTION

| | | |
|---|---|---|
| PATENT NO. | : 11,474,948 B2 | Page 1 of 1 |
| APPLICATION NO. | : 16/798103 | |
| DATED | : October 18, 2022 | |
| INVENTOR(S) | : Zoran Simic et al. | |

It is certified that error appears in the above-identified patent and that said Letters Patent is hereby corrected as shown below:

In the Claims

Column 23, Claim 6, Line 55, please delete "byte density".

Signed and Sealed this
Fourteenth Day of February, 2023

Katherine Kelly Vidal
*Director of the United States Patent and Trademark Office*